United States Patent

Ito et al.

[11] Patent Number: 5,941,615
[45] Date of Patent: Aug. 24, 1999

[54] MOVABLE STRUCTURE FOR A DISPLAY

[75] Inventors: Yukio Ito; Masashi Sugimoto, both of Nagoya, Japan

[73] Assignees: Harness System Technologies Research, Ltd., Aichi; Sumitomo Wiring Systems, Ltd., Mie; Sumitomo Electric Industries, Ltd., Osaka, all of Japan

[21] Appl. No.: 08/955,797

[22] Filed: Oct. 22, 1997

[30] Foreign Application Priority Data

Oct. 23, 1996 [JP] Japan .................................. 8-281029
Oct. 23, 1996 [JP] Japan .................................. 8-281030
Oct. 23, 1996 [JP] Japan .................................. 8-281031

[51] Int. Cl.$^6$ .................................................. A47B 5/00
[52] U.S. Cl. ........................ 312/7.2; 312/223.2; 361/681; 348/827
[58] Field of Search ................................. 312/7.2, 223.1, 312/223.2, 223.6, 311, 322; 348/826, 827, 830, 831, 836; 361/681, 682

[56] References Cited

U.S. PATENT DOCUMENTS

| 4,657,316 | 4/1987 | Hardt et al. ........................ 312/7.2 |
| 4,718,740 | 1/1988 | Cox ..................................... 312/223.2 |
| 4,832,419 | 5/1989 | Mitchell et al. ................. 312/223.2 X |
| 5,276,589 | 1/1994 | Bartlett et al. .................. 361/223.2 X |
| 5,494,447 | 2/1996 | Zaidan .............................. 361/681 X |
| 5,691,781 | 11/1997 | Siccardo ............................. 348/827 |

FOREIGN PATENT DOCUMENTS 6-87388   3/1994   Japan .

Primary Examiner—Peter M. Cuomo
Assistant Examiner—James O. Hansen
Attorney, Agent, or Firm—Oliff & Berridge, PLC

[57] ABSTRACT

A movable structure for a display includes: a display device placed in a substantially vertical state in a front opening of a chassis; a sliding member disposed on the chassis and supporting a lower fulcrum of a lower end portion of the display device so as to be movable in back and forth directions; and a guide groove disposed on the chassis and supporting an upper fulcrum of an upper end portion of the display device so as to be movable in vertical directions, so that the upper end portion of the display device downward moves while the lower end portion forward moves, thereby opening the front opening of the chassis, wherein the sliding member includes a first sliding member supported with the chassis so as to be slidable in the back and forth directions by a first sliding stroke, and a second sliding member supported on the first sliding member so as to be slidable in the back and forth directions by a second sliding stroke and supporting the lower fulcrum of the lower end portion of the display device, whereby the lower fulcrum of the lower end portion of the display device is movable in the back and forth directions by a sum of the first sliding stroke and the second sliding stroke.

11 Claims, 7 Drawing Sheets

MOVABLE STRUCTURE FOR A DISPLAY

BACKGROUND OF THE INVENTION

1. Field of the Invention

The invention relates to an improvement of a movable structure for a display which is used in an audio apparatus or the like.

2. Description of the Related Art

In an audio apparatus, a navigation apparatus, or an apparatus which functions as a navigation apparatus and also as an audio apparatus, usually, a display device 5 on which switches 3 and a display screen 4 are disposed is placed in a substantially vertical state in a front opening 2a of a front frame 2 of a box-like chassis 1 as shown in FIG. 6.

In the display device 5, as shown in FIG. 7A, a lower fulcrum 5a of the lower end portion is supported so as to be movable in horizontal directions, by a sliding member 6 which is disposed on a chassis 1, and an upper fulcrum 5b of the upper end portion is supported so as to be movable in vertical directions, by a guide groove 7 which is disposed in a front frame 2. As shown in FIGS. 7B and 7C, the upper end portion of the display device 5 is downward moved while the lower end portion is forward moved, thereby opening a front opening 2a of the front frame 2.

FIG. 7B shows a tilt state in which, in order to improve the visibility of the display device 5, the display device 5 is slightly rearward tilted.

When the display device 5 is largely opened, a cassette tape, a CD, an MD, or the like which is set into a space S in the chassis 1 can be easily replaced with another one.

In the above-described movable structure of the related art, when the front opening 2a is largely opened, the display device 5 is greatly projected from the front frame 2 toward the front side as shown in FIG. 7C. Consequently, the sliding member 6 which causes the lower fulcrum 5a of the lower end portion of the display device 5 to move in the horizontal direction must has a very long sliding stroke.

When the depth of the chassis 1 is so small that the sliding stroke of the sliding member 6 is restricted, the display device 5 is opened only in an oblique state as indicated by the two-dotted chain line a in FIG. 7C. This produces a problem in that it is difficult to conduct the work of replacing a cassette tape, or the like.

Further, in the above-described movable structure of the related art, since the upper and middle portions of the guide groove 7 formed in the front frame 2 are vertically linear, and only the lower portion is forward curved, when the projection amount of the display device 5 is restricted, therefore, the display device 5 is opened only in an oblique state as indicated by the two-dotted chain line a in FIG. 7C. This also produces a problem in that it is difficult to conduct the work of replacing a cassette tape, or the like.

In addition, since the display device is largely moved in the horizontal direction and also in vertical directions, the manner of handling a wiring member which connects electric parts in the display device with a socket in the chassis is problematic. To comply with this, a method of winding up a wiring member has been proposed (Japanese patent unexamined publication (Kokai) No. HEI6-87388). However, the proposed method has a problem in that the structure is complicated.

SUMMARY OF THE INVENTION

The invention has been conducted in order to solve the problem. It is an object of the invention to provide a movable structure for a display device in which, even when a chassis has a small depth or the sliding stroke of a sliding member is short, the sliding stroke of a sliding member can be increased and the display device can be largely opened at a substantially horizontal state. It is an another object of the invention to provide a movable structure for a display device in which a wiring member can be easily handled and undue stress which causes the wiring member to be broken is not applied to the wiring member.

In order to solve the problem, the invention provides a movable structure for a display includes: a display device placed in a substantially vertical state in a front opening of a chassis; and a sliding member disposed on the chassis and supporting a lower fulcrum of a lower end portion of the display device so as to be movable in back and forth directions; wherein the sliding member includes a first sliding member supported with the chassis so as to be slidable in the back and forth directions by a first sliding stroke, and a second sliding member supported on the first sliding member so as to be slidable in the back and forth directions by a second sliding stroke and supporting the lower fulcrum of the lower end portion of the display device, whereby the lower fulcrum of the lower end portion of the display device is movable in the back and forth directions by a sum of the first sliding stroke and the second sliding stroke.

According to the invention, since a sliding member is divided into two portions, i.e., the first sliding member and the second sliding member, the lower fulcrum of the lower end portion of the display device can move over the predetermined range in the back and forth directions at a sliding stroke which is a sum the sliding strokes of the first and second sliding members.

Even in the case where the depth of the chassis is so small that the sliding strokes of the sliding members are restricted, or the case where each of the sliding members has a short sliding stroke, the resulting total sliding stroke is long and hence the display device can be largely opened at a substantially horizontal state.

Furthermore, the structure may be configured so that a rack is formed in each of the first and second sliding members, large and small interlocking gears mesh with the racks, respectively, and the first and second sliding members slide at a sliding stroke which corresponds to a gear ratio of the large and small gears.

According to this configuration, the first and second sliding members can conduct the sliding operation at the strictly same sliding stroke.

In order to solve the above problem, the invention provides a movable structure for a display includes: a display device placed in a substantially vertical state in a front opening of a chassis; a sliding member disposed on the chassis and supporting a lower fulcrum of a lower end portion of the display device so as to be movable in back and forth directions; and a guide groove disposed on the chassis and supporting an upper fulcrum of an upper end portion of the display device so as to be movable in vertical directions, so that the upper end portion of the display device downward moves while the lower end portion forward moves, thereby opening the front opening of the chassis, wherein an upper groove of the guide groove chassis is rearward curved, whereby, when the upper end portion of the display device is vertically moved, the upper end portion of the display device is rearward moved.

According to the invention, the upper groove (including the middle portion) of the guide groove is rearward curved. When the upper end portion of the display device is moved particularly in the downward direction, therefore, the upper end portion is rearward moved, whereby the display device can be pulled into the interior of the chassis by a larger distance. Even when the sliding stroke of the sliding member is short, the display device can be largely opened at a substantially horizontal state.

Furthermore, the structure may be configured so that a lower groove of the guide groove of the chassis is forward curved with being continuous with the upper groove.

According to the invention, also the lower groove of the guide groove is forward curved with being continuous with the upper groove which is rearward curved. Consequently, the upper fulcrum of the upper end portion of the display device is smoothly guided over the whole length of the guide groove and the opening and closing movements of the display device are smoothly conducted.

Furthermore, the structure may be configured so that an angle which is formed by a line connecting the lower fulcrum of the lower end portion of the display device and the upper fulcrum of the upper end portion, and a center line of the guide groove is set to be substantially constant over a whole length of the guide groove.

According to this configuration, the upper fulcrum of the upper end portion of the display device is guided over the whole length of the guide groove by an average moving force (torque) and the opening and closing movements of the display device are further smoothly conducted.

In addition, in order to solve the another problem, the invention provides a movable structure for a display includes: a display device placed in a substantially vertical state in a front opening of a chassis; a sliding member disposed on the chassis and supporting a lower fulcrum of a lower end portion of the display device so as to be movable in back and forth directions; a guide groove disposed on the chassis and supporting an upper fulcrum of an upper end portion of the display device so as to be movable in vertical directions, so that the upper end portion of the display device downward moves while the lower end portion forward moves, thereby opening the front opening of the chassis; and a flexible wiring member which connects electric parts in the display device with a socket in the chassis, the wiring member having connecting portions connected to a back face portion in the vicinity of the upper fulcrum of the display device and the socket in the vicinity of the front opening of the chassis, and a bent portion provided between the connecting portions, wherein the bent portion is always sagged in the same direction in a range between highest and lowest moving positions of the upper end portion of the display device.

According to the invention, the wiring member has a sag and the sag is set so that a bent portion is always directed in the same direction in a range between highest and lowest moving positions of the upper end portion of the display device. Even when the display device is moved, therefore, only the vertical position of the bent portion is changed, so that the bent portion is not twisted nor reversely bent.

Consequently, a work of winding up the wiring member, and the like are not required, with the result that the structure for handling the wiring member can be very simplified. Furthermore, undue stress is not applied to the wiring member, and therefore the wiring member is hardly broken.

Furthermore, the structure may be configured so that a wiring pit which can hold the bent portion of the wiring member is disposed in the chassis. According to this configuration, the bent portion of the wiring member can be held at a substantially same position between the back face of the display device and the wiring pit.

BRIEF DESCRIPTION OF THE DRAWINGS

FIG. 5A is a side view showing the display device in a substantially vertical state, FIG. 5B is a side view showing the display device in a tilt state, FIG. 5C is a side view showing the display device in the course of movement, and FIG. 5D is a side view showing the display device in a substantially horizontal state;

FIG. 7A is a side view showing the display device in a substantially vertical state, FIG. 7B is a side view showing the display device in a tilt state, and FIG. 7C is a side view showing the display device in a substantially horizontal state.

DETAILED DESCRIPTION OF THE PREFERRED EMBODIMENTS

Hereinafter, an embodiment of the invention will be described in detail with reference to the accompanying drawings.

Figure 5A:
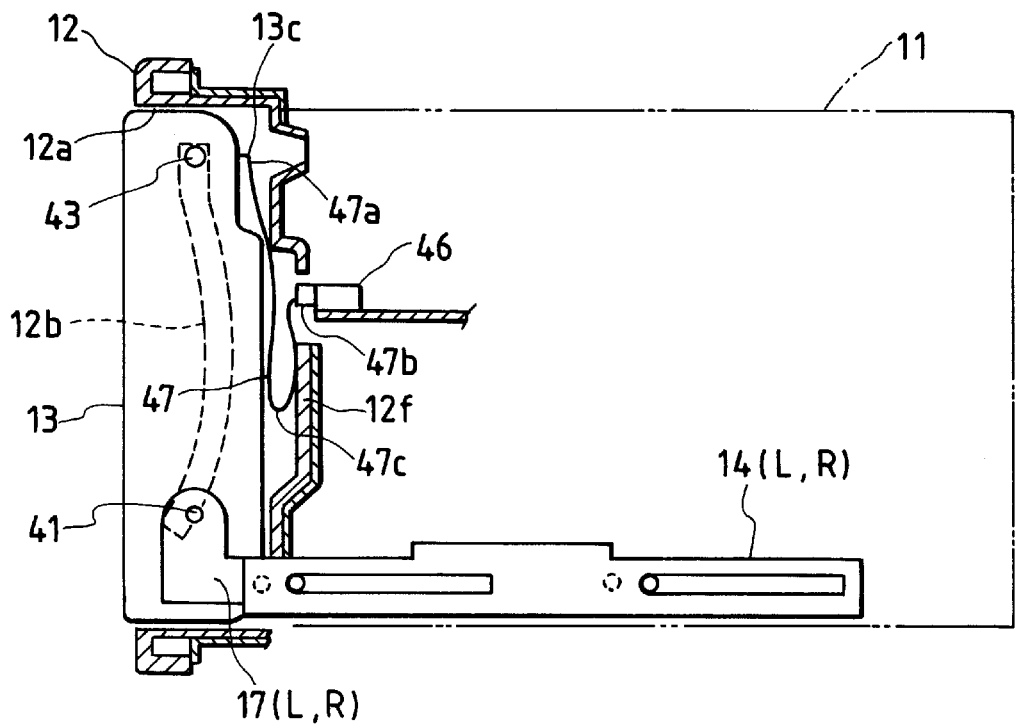
FIGS. 5A to 5D show relationships between sliding members, the display device, and guide grooves.

As shown in FIG. 5A, a display device 13 is placed in a substantially vertical state in a front opening 12a of a front frame 12 of a box-like chassis 11.

Figure 1:
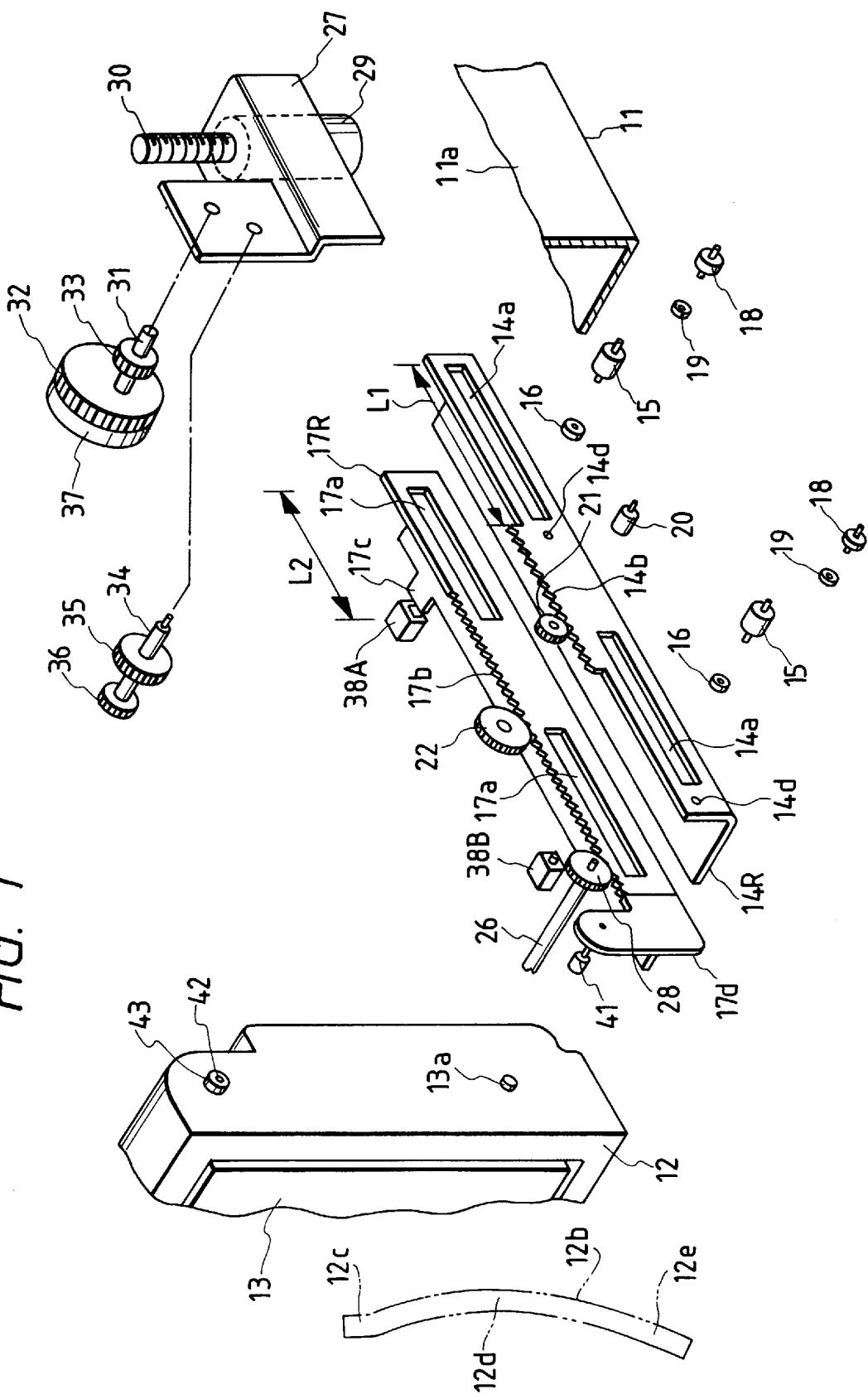
FIG. 1 is an exploded perspective view of the right side portion of the movable structure for a display device of the invention.

As shown also in FIG. 1, an inverted L-like first sliding member 14R which elongates in the back and forth directions is disposed in the bottom and right area of the interior of the chassis 11. Oblong holes 14a which elongate in the back and forth directions are formed in the front and rear ends of the first sliding member 14R, respectively.

Pins 15 are fixed to the right side portion 11a of the chassis 11. Rollers 16 which are rotatably fitted onto the pins 15 are fitted into the oblong holes 14a of the first sliding member 14R, respectively, whereby the first sliding member 14R is allowed to slide in the back and forth directions with respect to the chassis 11 at a predetermined stroke L1.

A rack 14b is formed at a substantially center position of the upper edge of the first sliding member 14R. The level of the rack 14b is higher than that of a rack 17b of a second sliding member 17R which will be described later.

The inverted L-like second sliding member 17R which elongates in the back and forth directions is disposed inside the first sliding member 14R. Oblong holes 17a which elongate in the back and forth directions are formed in the front and rear ends of the second sliding member 17R, respectively.

Pins 18 are fixed to fixing holes 14d of the inner portion of the first sliding member 14R. Rollers 19 which are rotatably fitted onto the pins 18 are fitted into the oblong holes 17a of the second sliding member 17R, respectively, whereby the second sliding member 17R is allowed to slide in the back and forth directions with respect to the first sliding member 14R at a predetermined stroke L2.

The rack 17b which elongates from the front end to a vicinity of the center is formed on the upper edge of the second sliding member 17R.

A pin 20 is fixed to the right side portion 11a of the chassis 11. A combination of small and large interlocking gears 21 and 22 which are integrally fixed to each other is rotatably fitted onto the pin 20. The small gear 21 meshes with the rack 14b of the first sliding member 14R and the large gear 22 meshes with the rack 17b of the second sliding member 17R.

According to this configuration, when the second sliding member 17R is slid at the predetermined stroke L2 in the back or forth direction, the first sliding member 14R is slid in the same direction via the rack 17b, the large gear 22, the small gear 21, and the rack 14b, at the predetermined stroke LI which corresponds to the gear ratio of the large and small gears 22 and 21.

In the embodiment, the sliding strokes L1 and L2 are set to be substantially equal to each other, so that the sliding members 14R and 17R equally share the sliding stroke (L1+L2) which is required as the whole of the sliding members 14R and 17R, whereby the sliding strokes L1 and L2 of the respective sliding members 14R and 17R are shortened (reduced by half).

Figure 2:
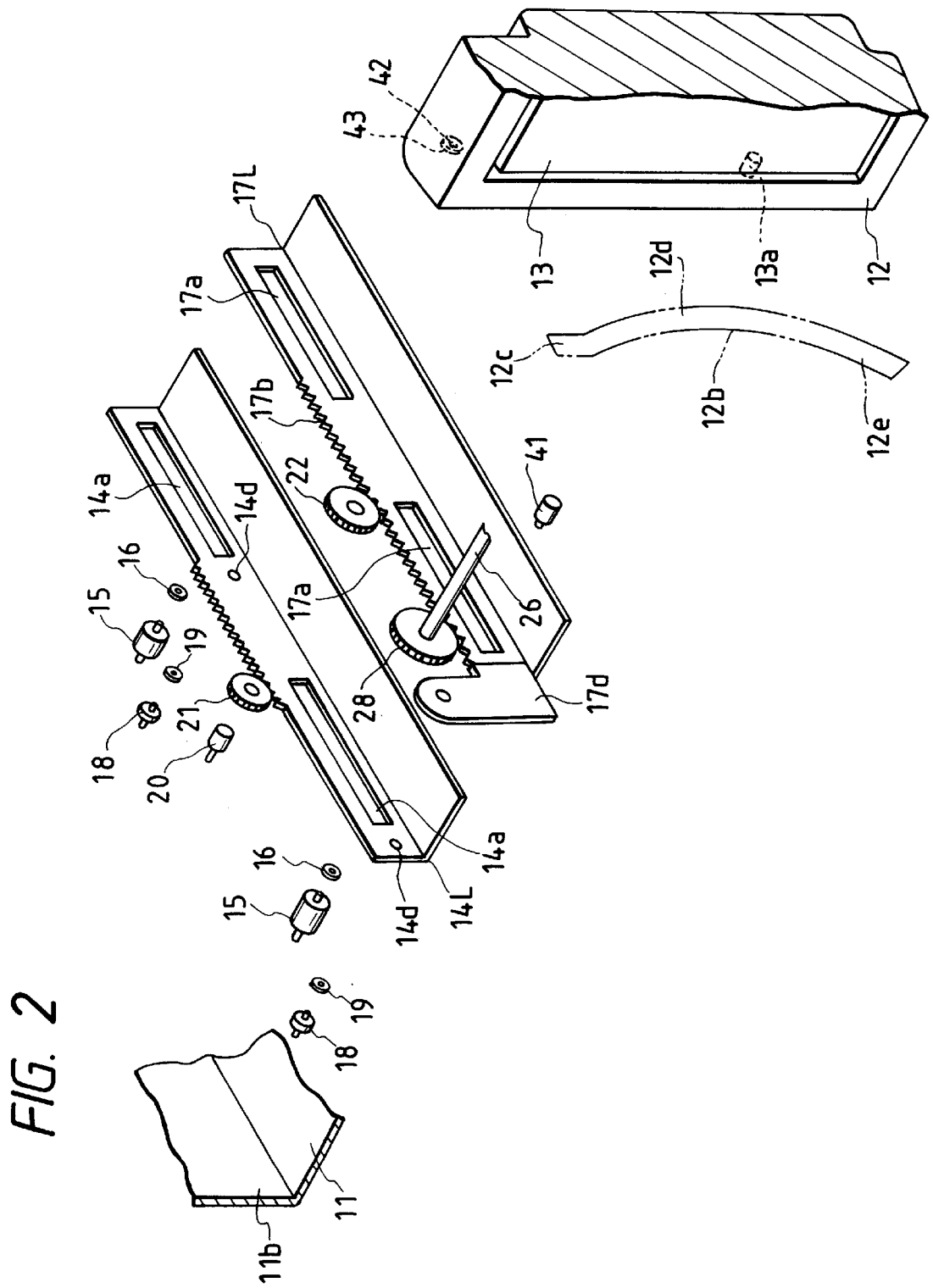
FIG. 2 is an exploded perspective view of the left side portion of the movable structure for a display device.

As shown in FIG. 2, first and second sliding member 14L and 17L which are laterally symmetric with the first and second sliding members 14R and 17R disposed in the bottom and right area are disposed in the bottom and left area of the interior of the chassis 11, so as to be slidable at the predetermined strokes L1 and L2 in the same manner as the first and second sliding members 14R and 17R.

An interlocking shaft 26 which laterally elongates is disposed above the front ends of the racks 17b of the left and right second sliding members 17L and 17R. The left end portion of the interlocking shaft 26 is rotatably supported by the left side portion 11b of the chassis 11, and the right end portion is rotatably supported by a bracket 27 fixed to the right side portion 11a of the chassis 11. Driving gears 28 which respectively mesh with the racks 17b of the left and right second sliding members 17L and 17R are fixed to the interlocking shaft 26.

According to this configuration, when the driving gears 28 are simultaneously rotated by the interlocking shaft the left and right second sliding members 17L and 17R interlockingly simultaneously slide in the back or forth direction.

A motor 29 is fixed to the bracket 27 with being upward directed. An output worm 30 of the motor 29 meshes with a worm wheel 32 which is rotatably supported by a support shaft 31 fixed to the bracket 27. A small gear 33 which is fixed to the worm wheel 32 via a slip mechanism 37 meshes with a large gear 35 which is rotatably supported by a support shaft 34 fixed to the bracket 27. A small gear 36 which is integrally fixed to the large gear 35 meshes with the right driving gear 28. The worm 30, the worm wheel 32, and the large and small gears 33, 35, and 36 constitute a reduction mechanism for the motor 29.

According to this configuration, the forward or reverse rotation of the motor 29 causes the left and right second sliding members 17L and 17R to slide electrically in the back or forth direction.

The slip mechanism 37 which prevents a torque of a level which is higher than a given one, from being transmitted is interposed between the worm wheel 32 and the small gear 33, so that the reduction mechanism and the like are prevented from being broken or biting.

A stroke detection projection 17c is disposed on the second sliding member 17R. When a closure detection switch 38A detects that the second sliding member 17R conducts the sliding stroke to the rear end, the rotation for the rearward sliding (for example, reverse rotation) of the motor 29 is automatically stopped.

When an open detection switch 38B detects that the second sliding member 17R conducts the sliding stroke to the front end, the rotation for the forward sliding (for example, forward rotation) of the motor 29 is automatically stopped.

Figure 3:
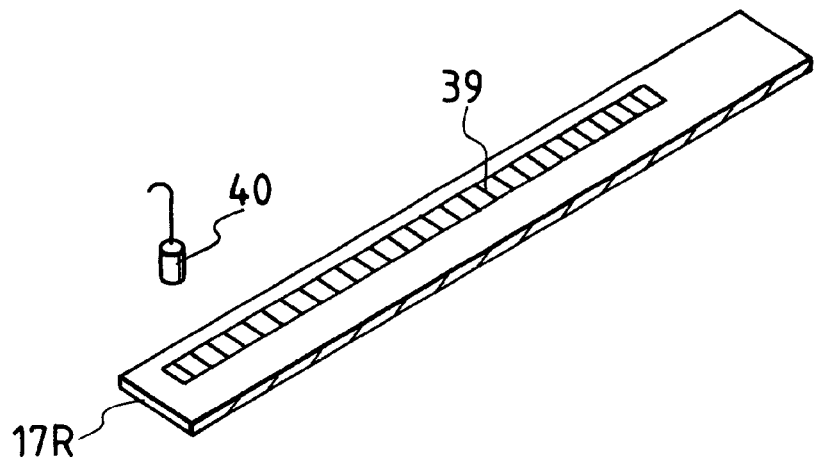
FIG. 3 is a perspective view of a reflector of a sliding member and a photosensor.

As shown in FIG. 3, a reflector 39 on which a light and dark stripe pattern is printed is stuck to the second sliding member 17R so as to elongate in the back and forth directions. A photosensor 40 which is disposed above the reflector 39 generates pulses according to the intensity of reflected light, and the pulses are counted by a counter, whereby the current sliding stroke of the second sliding member 17R can be accurately detected.

Rising brackets 17d are fixed to the front end portions of the left and right second sliding members 17L and 17R, respectively. Lower fulcrum shafts 41 which are rotatably fitted into holes 13a opened in the lower end portions of the sides of the display device 13 are fixed to the brackets 17d, respectively.

According to this configuration, when the second sliding members 17L and 17R slide in the back or forth direction, the lower end portion of the display device 13 is caused to slide in the back or forth direction by the lower fulcrum shafts 41.

Pins 42 are fixed to the upper end portions of the sides of the display device 13. Upper fulcrum rollers 43 which are rotatably fitted onto the pins 42 are fitted into guide grooves 12b which are formed on both sides of the front opening 12a of the front frame 12 and which vertically elongate, respectively.

According to this configuration, when the lower end portion of the display device 13 is moved in the back or forth direction by the second sliding members 17L and 17R, the upper end portion of the display device 13 is vertically moved by the function of the rollers 43 which are vertically guided by the guide grooves 12b.

Figure 4:
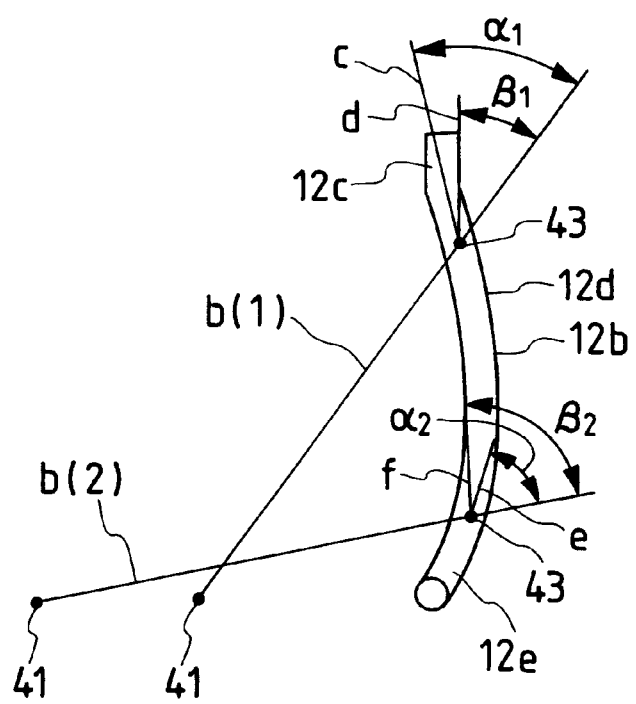
FIG. 4 is a front view of a guide groove of a front frame.

As shown in FIG. 4 in detail, in each of the guide grooves 12b, the upper end portion 12c is linear, the upper portion (including the middle portion) 12d which is below the portion 12c is rearward curved, and the lower portion 12e is forward curved.

Specifically, the upper portion 12d of each of the guide grooves 12b is set so that the angle a1 which is formed by the line b(1) connecting the lower fulcrum shaft 41 of the display device 13 and the upper fulcrum roller 43, and the center line c of the upper portion 12d is larger than the angle $\beta 1$ which is formed by the line and the center line d in the case where the guide groove is assumed to be linear.

The lower portion 12e of each of the guide grooves 12b is set so that the angle a2 which is formed by the line b(2) connecting the lower fulcrum shaft 41 of the display device 13 and the upper fulcrum roller 43, and the center line e of the lower portion 12e is smaller than the angle $\beta 2$ which is formed by the line and the center line f in the case where the guide groove is assumed to be linear.

The angles will be compared with each other by using numeral values. It is assumed that $\alpha 1$ is 50 deg., $\beta 1$ is 35 deg., $\alpha 2$ is 60 deg., and $\beta 2$ is 80 deg. In the case where the guide groove is linear, the difference between $\beta 1$ and $\beta 2$ is large (35 deg. and 80 deg.). By contrast, in the case where the guide groove 12b is curved, the difference between a1 and a2 is small (50 deg. and 60 deg.). In other words, the angles α1 and α2 are set to be substantially constant over the whole length of the guide groove 12b.

As shown in FIG. 5A, a flexible wiring member (for example, a flexible PCB) 47 is disposed so as to connect electric parts in the display device 13 with a socket 46 in the chassis 11.

The flexible PCB constituting the wiring member 47 is produced by forming wirings on a sheet-like substrate which is made of plastic. A substantially whole portion of the flexible PCB is flexible, however the ends 47a and 47b are formed so as to have shape retention of an appropriate level. Furthermore, the ends 47a and 47b are formed into a shape which is bent in a predetermined direction. According to this configuration, the above-mentioned state in which the wiring member sags in a fixed direction is ensured.

One end portion 47a of the wiring member 47 is pulled out through a back opening 13c of the display device 13 which is formed in the vicinity of the upper fulcrum roller 43. A bent portion 47c which is formed by hanging the wiring member and then returning upward is placed in a wiring pit 12f which is disposed in the rear of the front frame 12. The bent portion 47c and the wiring member 47 are held between the wiring pit 12f and the back face of the display device 13.

The other end portion 47b of the wiring member 47 is connected to the socket 46 which is disposed in the chassis 11 and in the vicinity of the front opening 12a.

The function of the thus configured movable structure for the display device 13 will be described.

It is assumed that the display device 13 closes the front opening 12a of the front frame 12 in a substantially vertical state as shown in FIG. 5A.

When an open switch is turned on under this state, the motor 29 forward rotates and the driving gears 28 are rotated via the reduction mechanism 30, 32, 33, 35, and 36 and the slip mechanism 37. As a result, the second sliding members 17L and 17R are forward slid by means of the racks 17b.

The forward sliding movement of the second sliding members 17L and 17R causes via the interlocking gears 21 and 22 the first sliding member 14L and 14R to be forward slid by means of the racks 14b.

As the lower end portion of the display device 13 is forward moved by means of the lower fulcrum shafts 41 by the forward sliding movement of the second sliding members 17L and 17R, the upper fulcrum rollers 43 are guided by the guide grooves 12b, whereby the upper end portion of the display device 13 is downward moved.

Figure 5B:
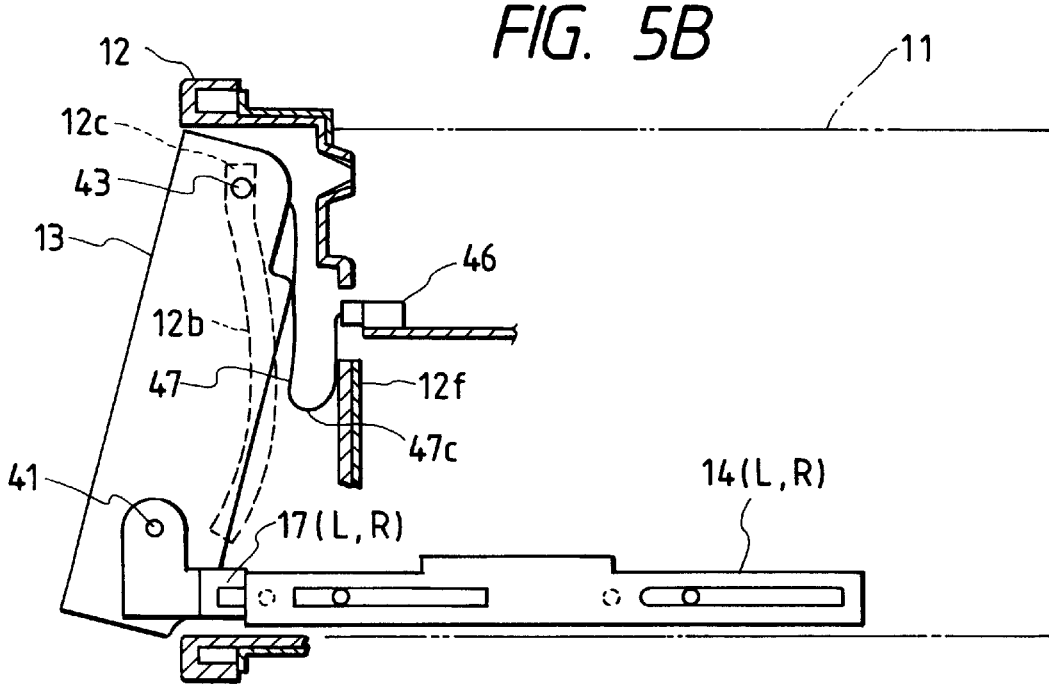

During a period when the upper fulcrum rollers 43 are in the linear upper grooves 12c of the guide grooves 12b as shown in FIG. 5B, the upper end portion of the display device 13 is not substantially moved in the back and forth directions and only the lower end portion is forward moved. Therefore, a tilt state in which the display device 13 is rearward tilted is attained.

In case that the display device 13 is to be automatically returned to the optimum tilt state, the sliding stroke of the second sliding members 17R in this state is previously detected by using the reflector 39 and the photosensor 40, and the second sliding members 17R are slid at a sliding stroke corresponding to the pulse number which is counted by the counter, whereby the display device 13 can be automatically returned to the optimum tilt state.

Figure 5C:
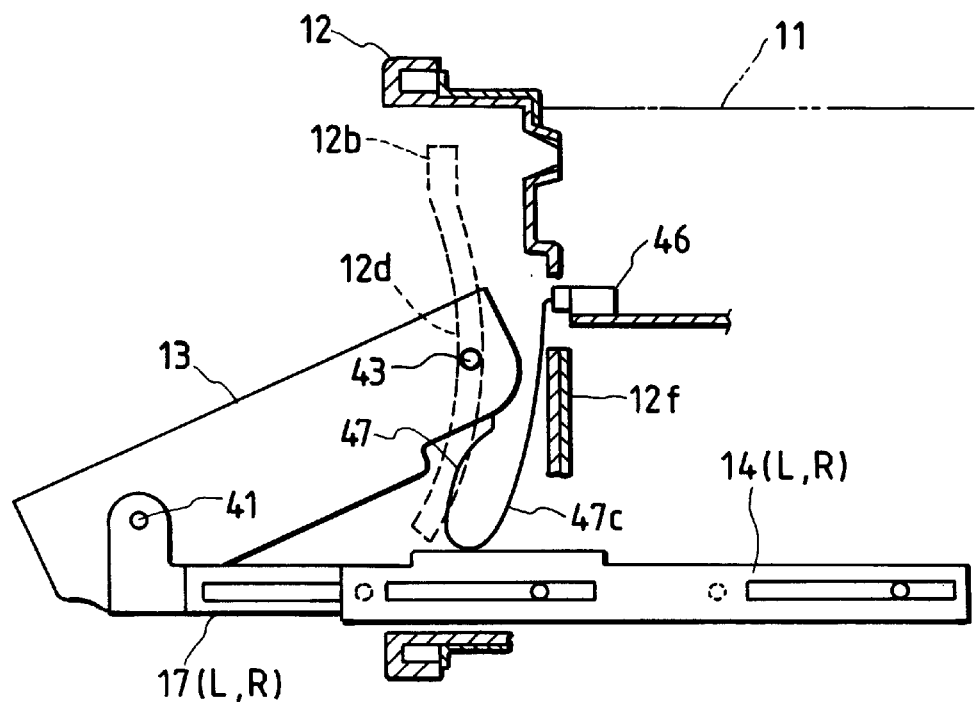
Figure 5D:
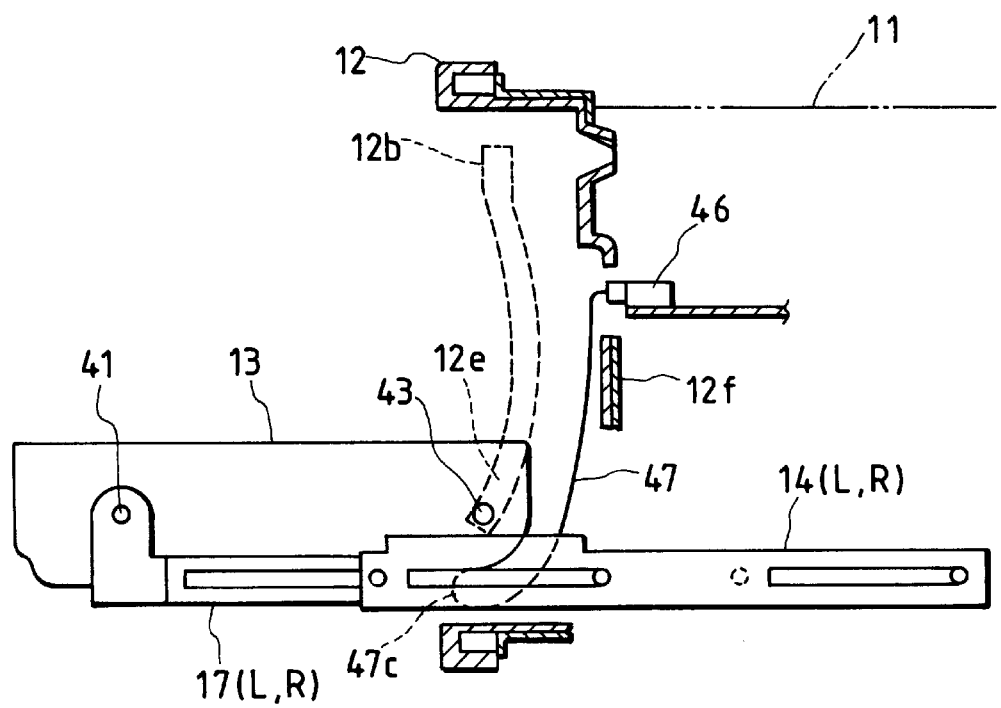
Figure 6:
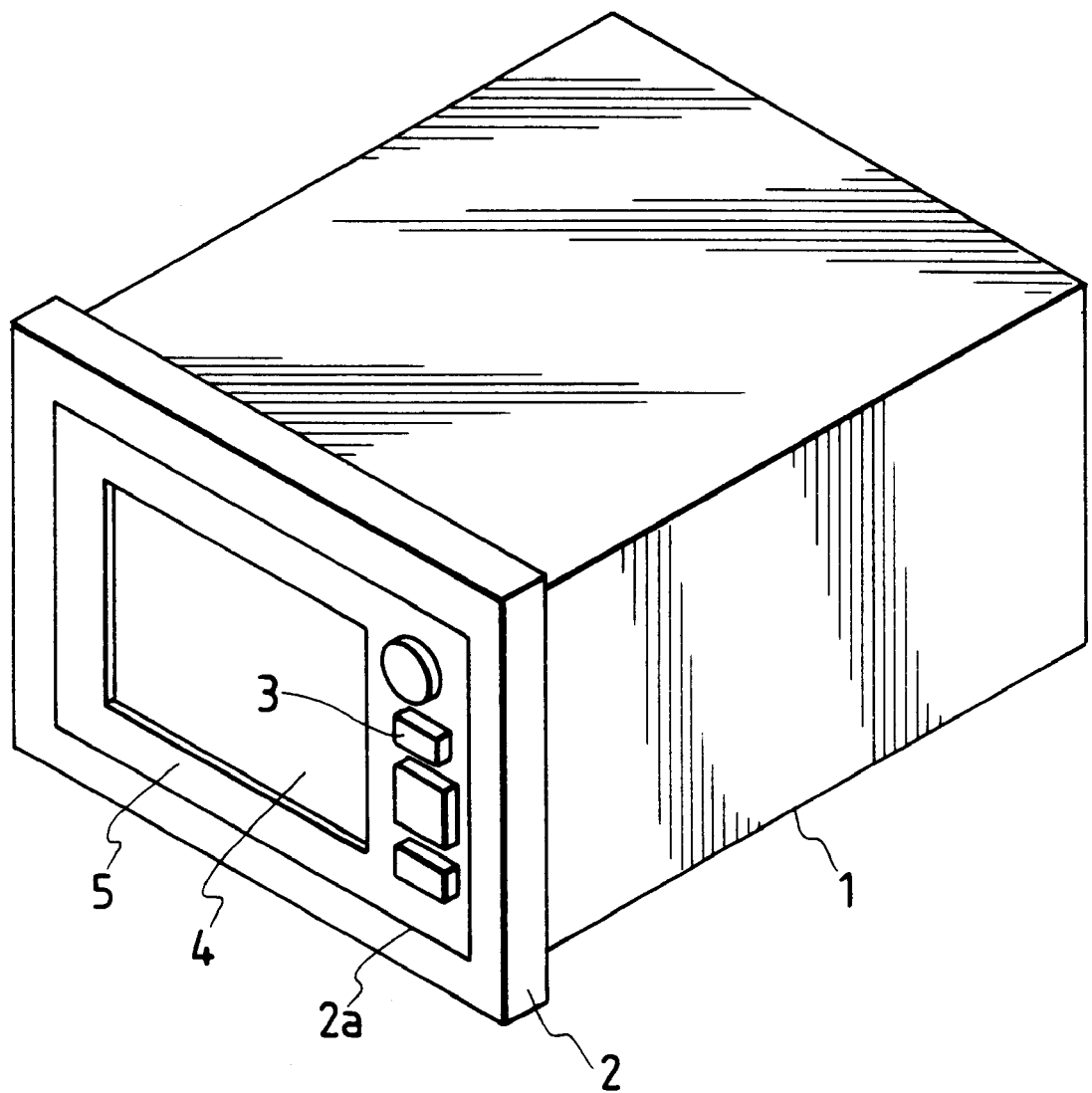
FIG. 6 is a perspective view showing relationships between the chassis, the front frame, and the display device.
Figure 7A:
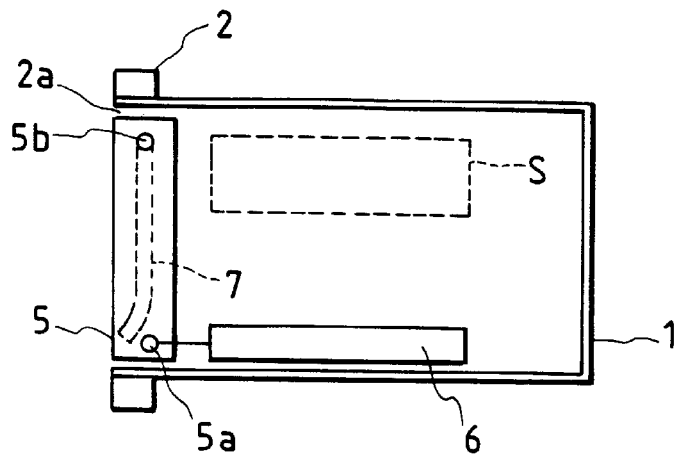
FIGS. 7A to 7C show relationships between the sliding members, the display device, and the guide grooves of the related art.
Figure 7B:
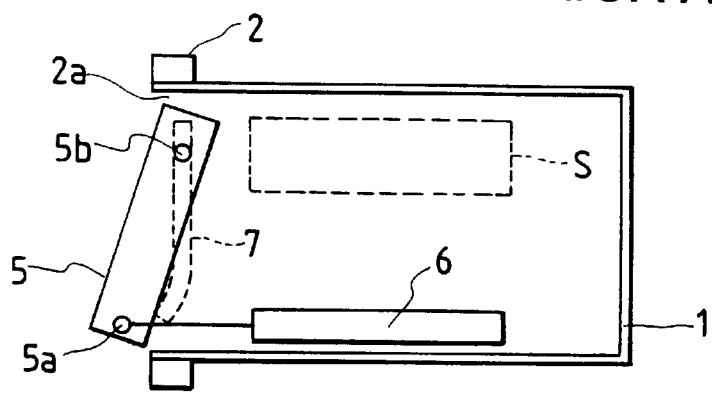
Figure 7C:
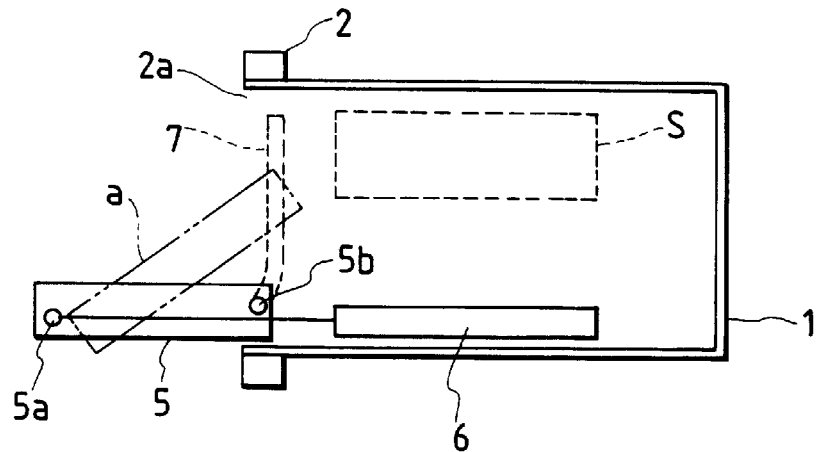

When the first sliding members 14L and 14R and the second sliding members 17L and 17R are further forward moved, the upper fulcrum rollers 43 are guided by the guide grooves 12b as the lower end portion of the display device 13 is further forward moved as shown in FIG. 5C by means of the lower fulcrum shafts 41, whereby the upper end portion of the display device 13 is further downward moved. As a result, as shown in FIG. 5D, the display device 13 is largely opened at a substantially horizontal state.

In this case, the total stroke L1+L2 of the lower fulcrum shafts 41 is shared by the first and second sliding members 14 and 17, and hence each of the sliding members 14 and 17 is required to have a length of only a half of the total stroke L1+L2. Even when the chassis 11 has a small depth, therefore, a required stroke can be sufficiently attained.

During the process of opening the display device 13, when the upper fulcrum rollers 43 reach the rearward-curved upper grooves 12d of the guide grooves 12b, the upper end portion of the display device 13 is rearward moved. When the upper fulcrum rollers 43 then reach the forward-curved lower grooves 12e, the upper end portion of the display device 13 is slightly forward moved from the position to which the upper portion has been rearward moved.

This curved shape of the guide grooves 12b produces the following advantage. As compared with the case of the conventional configuration in which the whole of each guide groove 12b, or the range from the upper end to the vicinity of the lower end is linearly formed, the upper end portion of the display device 13 is pulled into the interior of the chassis 11 by a larger distance. Even when the sliding strokes of the sliding members 14 and 17 (L and R) are short, therefore, the display device 13 can be largely opened to a substantially horizontal state.

In the guide grooves 12b, since the upper and lower grooves 12d and 12e are continuously curved, the upper fulcrum rollers 43 of the display device 13 are smoothly guided over the whole length of the guide grooves 12b. Consequently, also the opening and closing movements of the display device 13 can be smoothly conducted.

The angles α1 and α2 of the upper and lower grooves 12d and 12e of the guide grooves 12b are set so as to be substantially constant over the whole length of the guide grooves 12b.

Specifically, in the case where the guide groove is linear, when the display device 13 is inward pulled, the torque is large in the lower groove 12e and small in the upper groove 12d, with the result that the torque difference is large. Consequently, the upper fulcrum rollers 43 of the display device 13 are not guided by an average torque, so that the opening and closing movements of the display device 13 are not smoothly conducted.

By contrast, when the angles a1 and a2 are set so as to be substantially constant over the whole length of the guide grooves 12b, the upper fulcrum rollers 43 of the display device 13 are guided by an average torque. Therefore, the opening and closing movements of the display device 13 are further smoothly conducted.

During the movement of the display device 13 from the substantially vertical state to the largely opened horizontal state (also during the movement opposite to this), the bent portion 47c of the wiring member 47 is always bent in the same direction even though its vertical position is changed, and hence the bent portion is not twisted nor reversely bent.

Consequently, a work of winding up the wiring member 47, and the like are not required, so that the structure for handling the wiring member can be very simplified. Furthermore, undue stress is not applied to the wiring member, and therefore the wiring member is hardly broken.

In the embodiment, the sliding strokes of the sliding members 14 and 17 (L and R) are determined depending on the gear ratio of the large and small interlocking gears 22 and 21. Alternatively, large and small interlocking gears may be disposed on the driving gears 28, and the sliding members 14 and 17 (L and R) may be interlockingly moved by the driving gears 28, thereby conducting the sliding operation.

The large and small interlocking gears may be eliminated, and the second sliding members 17 (L and R) may be slid by the motor 29 in the back and forth directions. In this case, the end portions of the oblong holes 17a of the second sliding members 17 (L and R) are engaged with the rollers 16 of the first sliding members 14 (L and R), whereby the first sliding members 14 (L and R) can be interlockingly slid in the back and forth directions.

In the embodiment, the sliding stroke of the second sliding member 17R is detected by using the photosensor 40. Alternatively, a rotary switch may mesh with the rack 17b of the second sliding member 17R and the sliding stroke may be detected on the basis of pulses due to the rotation of the rotary switch.

When a rotary switch in which the forward and reverse rotations can be detected is used, it is possible to detect more accurately both the sliding direction and the sliding stroke.

In the embodiment, the sliding members 14 and 17 (L and R) are divided into two portions. However, in the case where the chassis 11 has few depth, the sliding members may be divided into more than three portions. Further, in the case where the chassis 11 has a sufficiently large depth, the sliding stroke of the first sliding members 14 (L and R) may be made longer and the second sliding members 17 (L and R) may be omitted.

The foregoing description of the preferred embodiments of the invention has been presented for the purpose of illustration and description only. It is not intended to be exhaustive or to limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

[Effects of the Invention]

As seen also from the above description, in movable structure for a display device of the invention, a sliding member is divided into the first sliding member and the second sliding member, and the lower fulcrum of the lower end portion of the display device can move in the back and forth directions at a sliding stroke which is a sum the sliding strokes of the first and second sliding members. Even in the case where the depth of the chassis is so small that the sliding strokes of the sliding members are restricted, or the case where each of the sliding members has a short sliding stroke, therefore, the resulting total sliding stroke is long and hence the display device can be largely opened to a substantially horizontal state. Consequently, the work of replacing a cassette tape, or the like can be easily conducted.

Further, when the first and second sliding members are configured so as to slide at a sliding stroke which corresponds to the gear ratio of the large and small interlocking gears, the first and second sliding members can conduct the sliding operation at the strictly same siding stroke.

Further, as seen also from the above description, in the movable structure for a display device of the invention, the upper groove of the guide groove on the side of the chassis is rearward curved, whereby, when the upper end portion of the display device is downward moved, the upper end portion is rearward moved, whereby the display device can be pulled into the interior of the chassis by a larger distance. Even when the sliding stroke of the sliding member is short, therefore, the display device can be largely opened at a substantially horizontal state. Consequently, the work of replacing a cassette tape, or the like can be easily conducted.

Further, when the lower groove of the guide groove is forward curved with being continuous with the upper groove which is rearward curved, the upper fulcrum of the upper end portion of the display device is smoothly guided over the whole length of the guide groove and the opening and closing movements of the display device are smoothly conducted.

Further, when the angle which is formed by the line connecting the lower fulcrum of the lower end portion of the display device and the upper fulcrum of the upper end portion, and the center line of the guide groove is set to be substantially constant over the whole length of the guide groove, the upper fulcrum of the upper end portion of the display device is guided over the whole length of the guide groove by an average moving force (torque) and the opening and closing movements of the display device are further smoothly conducted.

Further, as seen also from the above description, in the movable structure for a display device of the invention, the wiring member elongating between the display device and the chassis has a sag in which a bent portion is always directed in the same direction in a range between highest and lowest moving positions of the upper end portion of the display device. Even when the display device is moved, therefore, only the vertical position of the bent portion is changed, so that the bent portion is not twisted nor reversely bent. Unlike the prior art, consequently, a work of winding up the wiring member, and the like are not required, with the result that the structure for handling the wiring member can be very simplified. Furthermore, undue stress is not applied to the wiring member, and therefore the wiring member is hardly broken.

Further, when a wiring pit which can hold the bent portion of the wiring member is disposed in the chassis, the bent portion of the wiring member can be held at a substantially same position between the back face of the display device and the wiring pit.

What is claimed is:

1. A movable structure for a display comprising:
    a display device placed in a substantially vertical state in a front opening of a chassis; and
    a sliding member disposed on the chassis and supporting a lower fulcrum of a lower end portion of the display device so as to be movable in back and forth directions;
    wherein the sliding member includes a first sliding member supported with the chassis so as to be linearly slidable in the back and forth directions by a first sliding stroke, and a second sliding member supported on the first sliding member so as to be linearly slidable in the back and forth directions by a second sliding stroke and supporting the lower fulcrum of the lower end portion of the display device at front end portions thereof, whereby the lower fulcrum of the lower end portion of the display device is movable in the back and forth directions by a sum of the first sliding stroke and the second sliding stroke.

2. A movable structure of a display according to claim 1, further comprising:

a guide groove disposed on the chassis and supporting an upper fulcrum of an upper end portion of the display device so as to be movable in vertical directions, so that the upper end portion of the display device downward moves while the lower end portion forward moves, thereby opening the front opening of the chassis.

3. A movable structure for a display according to claim 1, wherein a rack is formed in each of the first and second sliding members, large and small interlocking gears mesh with the racks, respectively, and the first and second sliding members slide at a sliding stroke which corresponds to a gear ratio of the large and small gears.

4. A movable structure for a display according to claim 1, further comprising:
   a motor disposed in the chassis and for sliding the sliding member in the back and forth directions; and
   detecting means for detecting a sliding direction and a sliding stroke of the sliding member.

5. A movable structure for a display comprising:
   a display device placed in a substantially vertical state in a front opening of a chassis;
   a sliding member disposed on the chassis and supporting a lower fulcrum of a lower end portion of the display device so as to be movable in back and forth directions; and
   a guide groove disposed on the chassis and supporting an upper fulcrum of an upper end portion of the display device so as to be movable in vertical directions, so that the upper end portion of the display device downward moves while the lower end portion forward moves, thereby opening the front opening of the chassis,
   wherein upper and middle portions of the guide groove are rearward curved, whereby, when the upper end portion of the display device moves vertically down from the substantially vertical state, the upper end portion of the display device is rearward moved.

6. A movable structure for a display according to claim 5, wherein a lower groove of the guide groove of the chassis is forward curved with being continuous with the upper groove.

7. A movable structure for a display according to claim 6, wherein an angle which is formed by a line connecting the lower fulcrum of the display device and the upper fulcrum of the display device, and a center line of the guide groove is set to be substantially constant over a whole length of the upper and lower grooves.

8. A movable structure for a display according to claim 5, wherein the guide groove further comprises: a linear upper end groove which elongate s upwardly from an upper end of the upper groove so that the display device is tilted in a tilting state when the lower fulcrum of the display device forwardly moves from the substantially vertical state.

9. A movable structure for a display comprising:
   a display device placed in a substantially vertical state in a front opening of a chassis;
   a sliding member disposed on the chassis and supporting a lower fulcrum of a lower end portion of the display device so as to be movable in back and forth directions;
   a guide groove disposed on the chassis and supporting an upper fulcrum of an upper end portion of the display device so as to be movable in vertical directions, so that the upper end portion of the display device moves downward, while the lower end portion forward moves, thereby opening the front opening of the chassis; and
   a flexible wiring member which connects electric parts in the display device with a socket in the chassis, the wiring member having connecting portions connected to a back face portion in the vicinity of the upper fulcrum of the display device at one end thereof and the socket in the vicinity of the front opening of the chassis at the other end thereof, and a bent portion provided between the connecting portions,
      wherein the bent portion is always sagged in the same direction in a range between highest and lowest moving positions of the upper end portion of the display device.

10. A movable structure for a display according to claim 9, wherein a wiring pit holding the bent portion of the wiring member is disposed in the chassis.

11. A movable structure for a display according to claim 9, wherein the wiring member has a sufficient length so that the bent portion is always sagged in the same direction during the movement of the display device in a range between the highest and lowest moving positions of the upper end portion of the display device.

* * * * *